Patented Jan. 17, 1950

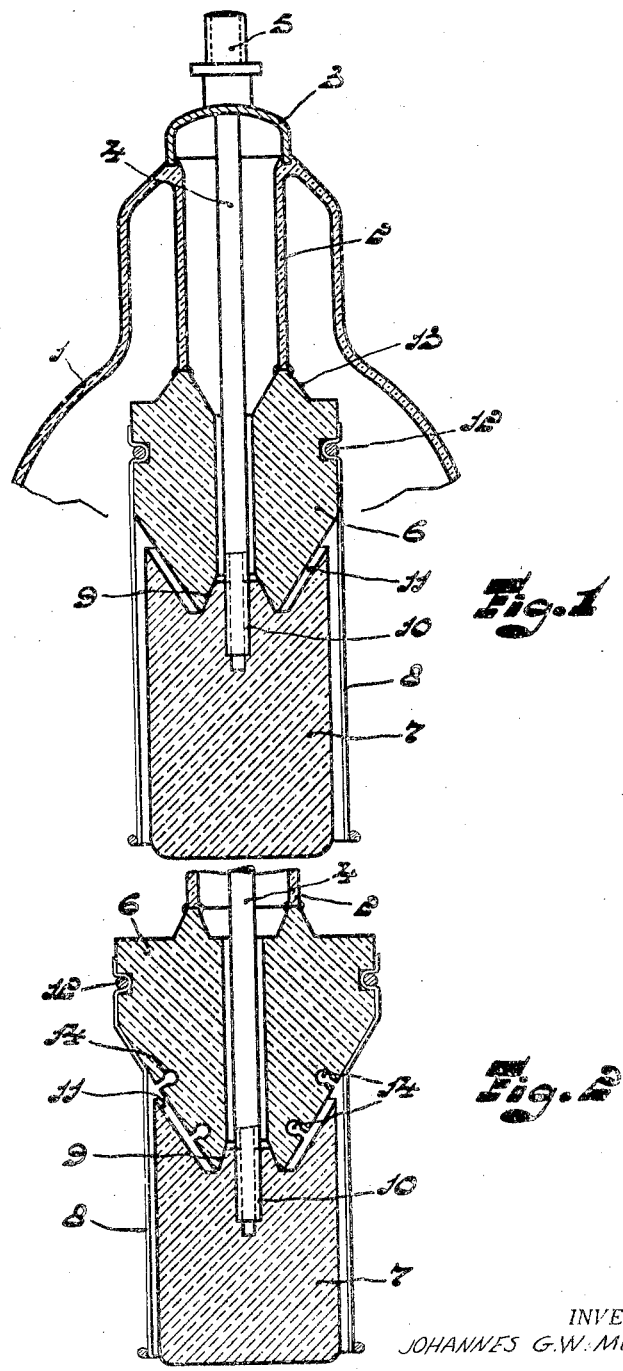

2,494,895

UNITED STATES PATENT OFFICE 2,494,895

ELECTRIC DISCHARGE TUBE WITH
PROTECTED ELECTRODE INLET

Johannes Gijsbertus Wilhelm Mulder, Eindhoven,
Netherlands, assignor to Hartford National
Bank and Trust Company, Hartford Conn., as
trustee Application July 20, 1946, Serial No. 685,210
In Belgium May 2, 1945

Section 1, Public Law 690, August 8, 1946
Patent expires May 2, 1965

3 Claims. (Cl. 250—27.5)

This invention relates to an electric discharge tube comprising a ceramic member by which the inlet for an electrode is protected against the discharge and which is sealed to the glass of the wall of the tube (or an extension thereof).

In the conventional tubes the ceramic member consists of a comparatively long ceramic tube which is slipped on the electrode terminal and also extends inside the electrode body. Between the ceramic tube and the electrode body is provided an axial air space and the end of the ceramic tube fits in the electrode more or less closely. The ceramic tube serves at the same time to carry the screen surrounding the electrode. However, the centration of the screen with respect to the electrode is very difficult since the screen is clamped by means of a bush, on the comparatively thin ceramic tube. Furthermore, the tube and the electrode are slightly movable with respect to each other.

To reduce the difficulties experienced in centering the electrode-screen it has already been proposed to provide the ceramic tube with one or more thickenings and to clamp the anode-screen thereto. The ceramic member required therefor is obtained by turning off a thick ceramic tube having a small bore, which requires a great deal of turning so that it is used only for expensive tubes.

According to the invention, in an electric discharge tube comprising a ceramic member by which an electrode inlet is protected against the discharge and which is sealed to the glass of the wall of the tube, the ceramic member has such a shape and consists of such a material that it can be formed by moulding, and between the ceramic member and the electrode is provided an air space of which the boundaries form an acute angle with the axis of the electrode. In order that the ceramic member be mouldable its height must generally not exceed twice its diameter. The ceramic member is preferably furnished with a conical edge for centering the electrode. The use of a ceramic member according to the invention yields the advantage that no or substantially no turning is necessary. Thus, for instance a continuous groove may be provided for clamping the electrode screen.

In spite of the fact that the ceramic member is comparatively short, so that no axial air space can be provided, the air space, owing to the acute angle relatively to the axis of the electrode, has a better length than if a radial air space would have to be used. In addition the leakage path between electrode and screen is comparatively long.

To prevent the electrode screen from being unduly electrically connected to the electrode, because the ceramic member becomes conducting by disintegrated or vaporised material the ceramic member is furnished with one or more grooves by which the formation of a continuous conducting layer is counteracted. To facilitate the sealing of the ceramic member to the glass this is preferably provided with a rim.

In the case of centration of the electrode screen requiring special precision the ceramic member is furnished with a conical edge for centering this screen.

In order that the invention may be clearly understood and readily carried into effect it will now be described more fully with reference to the accompanying drawing, given by way of example, wherein Figures 1 and 2 represent protected electrode inlets by means of a ceramic member according to the invention.

In Figure 1 the reference numeral 1 denotes the wall of the discharge tube which has a tubular re-entrant part 2. The wall has sealed to it a chrome-iron cap 3 which carries the terminal wire 4 of the electrode and a connection 5. To the glass tube 2 is sealed a ceramic member 6 having a rim 13. In the present case the electrode consists of graphite and is pressed by means of the screwthread 10 on the terminal wire against the ceramic member. The interfitting conical edges 9 provide that the ceramic member and the anode are centered with respect to one another. Between the ceramic member and the anode is provided a conical air space having an acute half vertical angle. The ceramic member has secured to it an anode screen 8 of gauze which, by means of a spring ring 12, is clamped into a continuous groove.

In Figure 2 the ceramic member has a slightly different shape. In effect, the wall bounding the air space extends a little further and hereon the anode screen having a conical edge is centered. In the wall bounding the air space is provided a continuous groove 14 having such a shape that no continuous conducting layer is formed by disintegration or vaporisation. The remaining parts bear the same reference numerals as in Figure 1.

What I claim is:

1. An electric discharge tube comprising an envelope having a tubular re-entrant portion, a lead-in conductor positioned within said re-entrant portion and extending from the ends thereof, one end of said lead-in conductor being hermetically sealed to said envelope at the outer end of said re-entrant portion, a cylindrical electrode member having a coaxially positioned conical cavity and a conical portion extending from the bottom of said cavity at one end of said electrode member said electrode member being coaxially secured to said lead-in conductor at the said end thereof, a ceramic cylindrical member interposed between the inner end of said re-entrant portion and said electrode member and surrounding said lead-in conductor, said ceramic member having one end thereof abutting and fused to the said inner end of said re-entrant portion and having the other end thereof provided with a conical portion and a coaxially arranged conical aperture said ceramic body engaging said conical portion of said electrode member at said conical aperture, and a tubular screen member coaxially surrounding said electrode member and said ceramic member and secured to said ceramic member.

2. An electric discharge tube comprising an envelope having a tubular re-entrant portion, a lead-in conductor positioned within said re-entrant portion and extending from the ends thereof, one end of said lead-in conductor being hermetically sealed to said envelope at the outer end of said re-entrant portion, a cylindrical electrode member having a coaxially positioned conical cavity and a conical portion extending from the bottom of said cavity at one end of said electrode member said electrode member being coaxially secured to said lead-in conductor at the said end thereof, a ceramic cylindrical member interposed between the inner end of said re-entrant portion and said electrode member and surrounding said lead-in conductor, said ceramic member having one end thereof abutting and fused to the said inner end of said re-entrant portion and having the other end thereof provided with a conical portion having a positioning edge extending beyond the plane of said electrode and a coaxially arranged conical aperture, said ceramic body engaging said conical portion of said electrode member at said conical aperture, and a tubular screen member coaxially surrounding said electrode member and said ceramic member and secured to and positioned by said conical portion at said positioning edge of said ceramic member.

3. An electric discharge tube comprising an envelope having a tubular re-entrant portion, a lead-in conductor positioned within said re-entrant portion and extending from the ends thereof, one end of said lead in conductor being hermetically sealed to said envelope at the outer end of said re-entrant portion, a cylindrical electrode member having a coaxially positioned conical cavity and a conical portion extending from the bottom of said cavity at one end of said electrode member said electrode member being coaxially secured to said lead-in conductor at the said end thereof, a ceramic cylindrical member having a plurality of continuous coaxial annular grooves, said ceramic member being interposed between the inner end of said re-entrant portion and said electrode member and surrounding said lead-in conductor, said ceramic member having one end thereof abutting and fused to the said inner end of said re-entrant portion and having the other end thereof provided with a conical portion and a coaxially arranged conical aperture said ceramic body engaging said conical portion of said electrode member at said conical aperture, and a tubular screen member coaxially surrounding said electrode member and said ceramic member and secured to said ceramic member.

JOHANNES GIJSBERTUS
WILHELM MULDER.

REFERENCES CITED

The following references are of record in the file of this patent:

UNITED STATES PATENTS

| Number | Name | Date |
|---|---|---|
| 2,084,913 | Kauffeldt | June 22, 1937 |
| 2,097,490 | Kobel | Nov. 2, 1937 |
| 2,217,398 | Baier | Oct. 8, 1940 |
| 2,308,939 | Siemens et al. | Jan. 19, 1943 |

FOREIGN PATENTS

| Number | Country | Date |
|---|---|---|
| 380,409 | Italy | May 11, 1940 |
| 410,410 | Great Britain | May 17, 1934 |